April 2, 1957     G. E. MONTGOMERY     2,787,181
SLIDABLE JAW ADAPTER FOR WRENCH
Filed Sept. 12, 1955

INVENTOR.
G. E. MONTGOMERY
BY
ATTORNEYS

United States Patent Office 2,787,181
Patented Apr. 2, 1957

2,787,181

SLIDABLE JAW ADAPTER FOR WRENCH

George E. Montgomery, Oklahoma City, Okla., assignor to Phillips Petroleum Company, a corporation of Delaware Application September 12, 1955, Serial No. 533,737

6 Claims. (Cl. 81—179)

This invention relates to a tubing coupling break-out adapter. In one aspect it relates to such an adapter which grips a tubing coupling and is provided with a tongs engaging element having the same diameter as the tubing to permit unthreading of the coupling with the same power tongs which are used to turn the tubing.

When pulling or running tubing in a well, it is common practice to use a powered wrench. This wrench is commonly called power tubing tongs and has jaws which fit the body of the tubing. The wrench also provides power to turn the tubing into and out of a tubing coupling. When a joint of tubing is disconnected from a next lower joint of tubing the coupling connecting the two joints usually remains threaded to the lower joint of tubing. Occasionally a coupling becomes damaged and it must be removed from the joint of tubing to which it remains attached. Common practice involves a change of jaws in the powered wrench for unthreading the coupling. Couplings are frequently unthreaded manually from tubing but it is a difficult operation and the use of a powered wrench effects considerable saving in time. However, to change the jaws in a powdered wrench for removal of the coupling also consumes considerable time. Powered wrenches are frequently necessary for removing couplings because a coupling is ordinarily threaded to one end of a joint of tubing at the steel mill and such a connection is very difficult to unthread in the field.

An object of my invention is to provide a tubing coupling break-out adapter.

Another object of my invention is to provide a tubing coupling break-out adapter for use with powered tongs without changing of jaws from those normally used in threading and unthreading tubing from couplings.

Another object of my invention is to provide such a tubing coupling break-out adapter which is simple to operate and effects appreciable savings in operators' time.

Still other objects and advantages of my invention will be realized upon reading the following description, which taken with the attached drawing, forms a part of this specification.

My invention is directed specifically to a tubing coupling break-out adapter which is provided with at least one toothed jaw or slip disposed on the inner surface of an out-of-round member. This jaw or slip moves peripherally a short distance upon rotation of the coupling break-out adapter. Rotation is effected by the usual power tongs acting upon a member rigidly attached to the main body of the adapter and which member has substantially the same diameter as the outer diameter of the tubing from which the coupling is to be removed. In this manner the jaws of the tubing tongs need not be replaced by jaws suitable for gripping the coupling in order to unthread the coupling.

In the drawing, Figure 1 is an elevational view, partly in section, of the apparatus of my invention.

Figures 1, 2, 3:
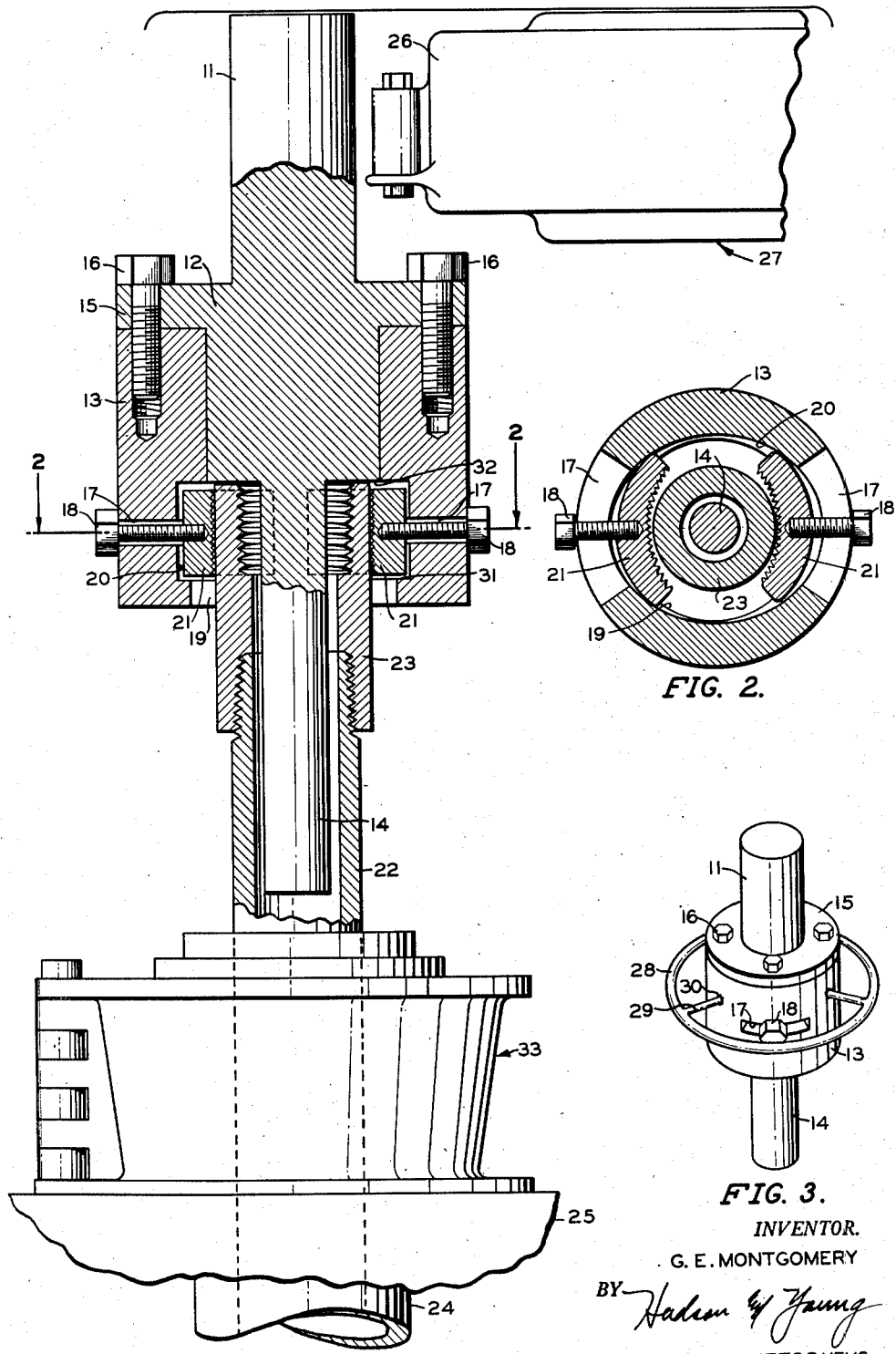
Figure 2 is a view, in section, taken on the line 2—2 of Figure 1.
Figure 3 illustrates a modification of the adapter of Figure 1.

Referring to the drawing and specifically to Figure 1, reference numeral 12 identifies a body member of generally circular cross section, to the top of which is attached an elongated tongs engaging member 11. Depending from the bottom of body member 12 is a guide 14. A cam section 13 is disposed around the body member 12, being attached thereto by bolts 16 threaded through a flange 15. The lower portion of the cam section 13 is hollowed out and when this hollowed out section is taken in conjunction with the upper portion of guide 14, a space is formed between the guide and the inner surface of the lower portion of the cam section. As can be seen from Figure 2, this hollowed out portion or space is not circular in cross section but is out-of-round. It can be of an ellipsoidal cross section or any other suitable out-of-round form, provided that it has two unequal diameters. Reference numeral 20 identifies this out-of-round inner surface of the lower portion of cam section 13. A still lower portion of the cam section 13 is provided with a circular opening 19. This circular opening 19 has a diameter substantially equal to the short diameter of the out-of-round section. This larger diameter portion of the lower cam section provides a pair of shoulders 31. A jaw or slip 21 is provided on a shoulder 31, or preferably a separate jaw or slip 21 is provided on each shoulder 31. It is preferable, however, to provide a more substantial means for holding these slips in position. Such means I have illustrated in the figures by bolts 18 which are threaded part way through the slips. These bolts 18 extend through slots 17 which are of sufficiently great length to permit peripheral movement of the slips. In Figure 1 is illustrated the tubing coupling break-out adapter of my invention in operable position for removal of a coupling 23 from a joint of tubing 22. When the adapter is in position the guide 14 extends into the top end of the tubing and the coupling 23 extends upward through the circular opening 19 and the out-of-round opening 20 and usually is in contact with a downward facing annular surface 32 of body member 12. Upon rotation of the adapter with respect to the coupling 23, the slips tend to remain stationary and are wedged between cam sections 13 and coupling 23. If necessary, the slips can be held stationary until they engage the coupling. Upon further rotation of the adapter the coupling is either tightened or loosened, as the case may be, with respect to the tubing.

The elongated tongs engaging member 11 is intended to have the same diameter as the outer diameter of tubing 22 so that the same jaws can be used in the power tongs to rotate member 11 for removing the coupling as are used for turning a joint of tubing with respect to a next coupling. In Figure 1 is illustrated the tubing 22 extending into a casing 24 disposed below a drill platform 25. A tubing power tongs 27 is provided with jaws 26 for rotation of tubing and according to my invention for threading or unthreading a coupling from a joint of tubing. A casing-tubing slip bowl 33 is provided with slips (not shown) to support tubing 22 and to prevent rotation when power is applied to thread or to unthread coupling 23 from the tubing. If necessary a back up wrench may be used.

In the use of the apparatus of my invention, it is merely necessary to position the apparatus directly above a tubing coupling to be removed and lowering the apparatus until it comes to rest on the top surface of the coupling with the guide 14 being disposed within the tubing as illustrated in Figure 1. It is then merely necessary to employ the power tongs without change of jaws to the tongs engaging member 11 and thread or unthread the coupling 23 as desired.

One modification of my invention involves providing a wheel 28 having spokes 29 which are welded at 30 to the outer surface of cam member 13 for assistance in turning the adapter by hand to set the slips or to make up partially coupling until such time as the power wrench is required to tighten the joint.

The apparatus of my invention is usually made from ordinary materials utilized for such construction, such materials being various grades of steel. The jaws 21, of course, should be made from such material as is adaptable for tempering.

I claim:

1. A tubing coupling break-out and threading and unthreading adapter comprising, in combination, a body, a tongs engaging member attached to and extending above the top of said body, the diameter of said tongs engaging member and the diameter of a tubing provided with a coupling for threading and unthreading therefrom being substantially the same, a guide member depending from the bottom of said body, said guide member being adapted for entrance into said tubing, a cam member attached to said body, at least a part of said cam member surrounding said guide member at a spaced distance therefrom providing a free space therebetween, said portion of said cam member having one inner diameter greater than a second inner diameter, a slip disposed adjacent the inner surface of said cam member surrounding said guide member, said slip being positioned at one extremity of said greater diameter, the free space within said portion of said cam member being adapted to accommodate said coupling, said second inner diameter of said portion of said cam member being of such length that upon movement of said slip circumferentially with respect to said adapter said slip sets to engage said coupling.

2. In the tubing coupling break-out adapter of claim 1, a separate slip disposed adjacent the inner surface of said cam member surrounding said guide member at opposite extremities of said greater diameter, the free space within said portion of said cam member between said slips being adapted to accommodate said coupling, said second inner diameter of said portion of said cam member being such that upon movement of said slips in the same circumferential direction with respect to said adapter said slips set to engage said coupling.

3. In the tubing coupling break-out adapter of claim 1, a slot in said portion of said cam member at said extremity of said greater diameter, means in said slot to hold said slip in an operable position adjacent the inner wall of said cam member prior to movement of said slip to engage said coupling.

4. In the tubing coupling break-out adapter of claim 2, a separate slot in said portion of said cam member at each extremity of said greater diameter, separate means in said slots to hold said slips in operable positions adjacent the inner wall of said cam member prior to movement of said slips to engage said coupling.

5. In the tubing coupling break-out adapter of claim 1, a hand wheel attached to the outer surface of said cam member for manual rotation of said adapter.

6. A tubing coupling break-out, threading and unthreading adapter comprising, in combination, a body, a tongs engaging member attached to and extending above the top of said body, the diameter of said tongs engaging member and a tubing provided with a coupling for threading and unthreading therefrom being substantially the same, a guide member depending from the bottom of said body, said guide member being adapted to enter said coupling and tubing, a cam-slip assembly within said body and surrounding said guide member, said cam-slip assembly being adapted to slide over and around said coupling upon lowering of said adapter and entrance of said guide member into said coupling and tubing, said tongs engaging member being adapted to be gripped by the same jaws of a tongs that grip said tubing.

References Cited in the file of this patent

UNITED STATES PATENTS

| | | |
|---|---|---|
| 810,304 | Remion | Jan. 16, 1906 |
| 1,740,377 | Snyder et al. | Dec. 17, 1929 |
| 1,902,216 | Buttress | Mar. 21, 1933 |
| 1,990,197 | Mohr | Feb. 5, 1935 |
| 2,632,352 | Alpers | Mar. 24, 1953 |
| 2,681,582 | Valvano | June 22, 1954 |

FOREIGN PATENTS

| | | |
|---|---|---|
| 288,152 | Germany | Oct. 21, 1915 |